Feb. 22, 1927.　　　J. A. DOANE　　　1,618,275
MILLING LATHE
Filed Dec. 30, 1922　　8 Sheets-Sheet 1
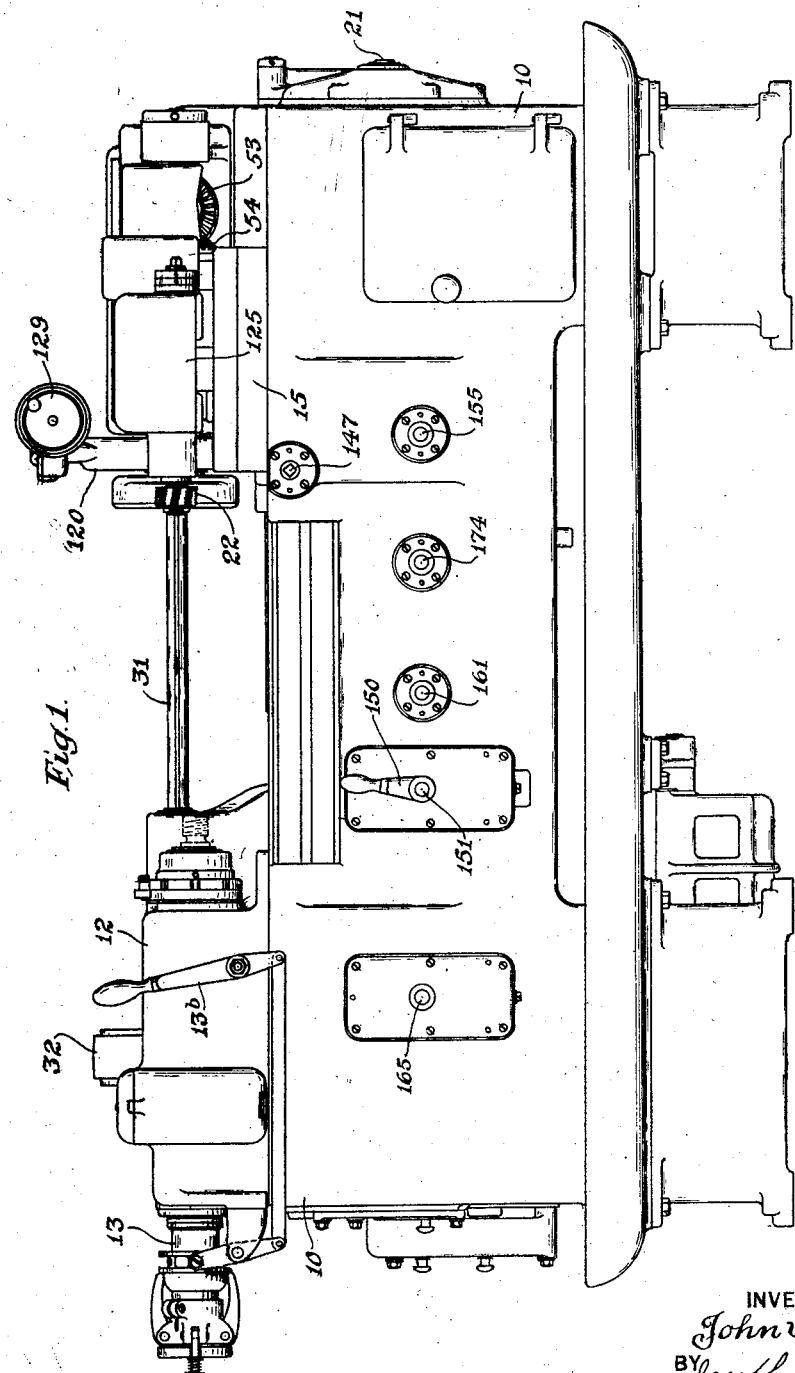
INVENTOR
John A. Doane.
BY Joseph K. Schofield
ATTORNEY

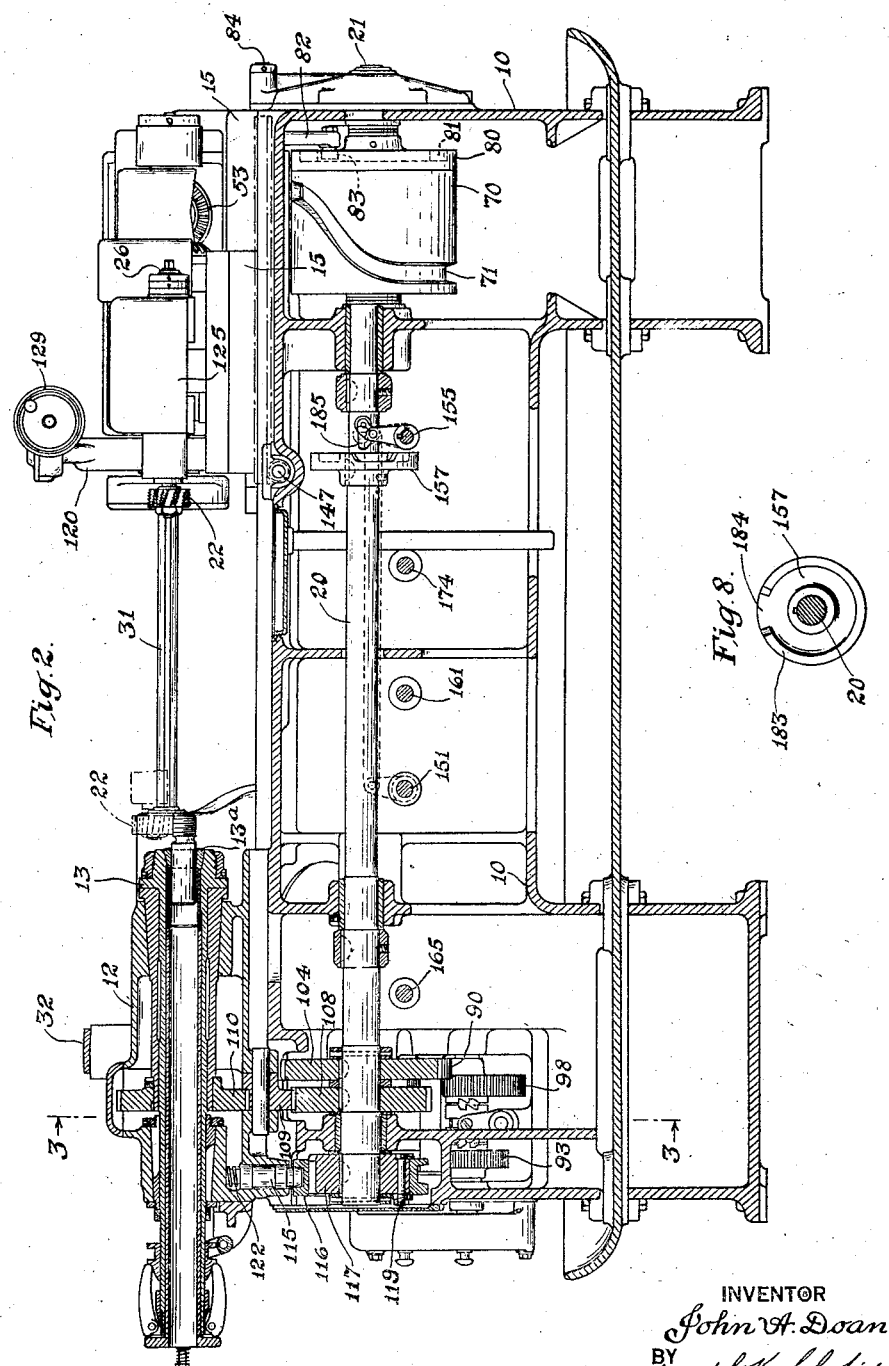

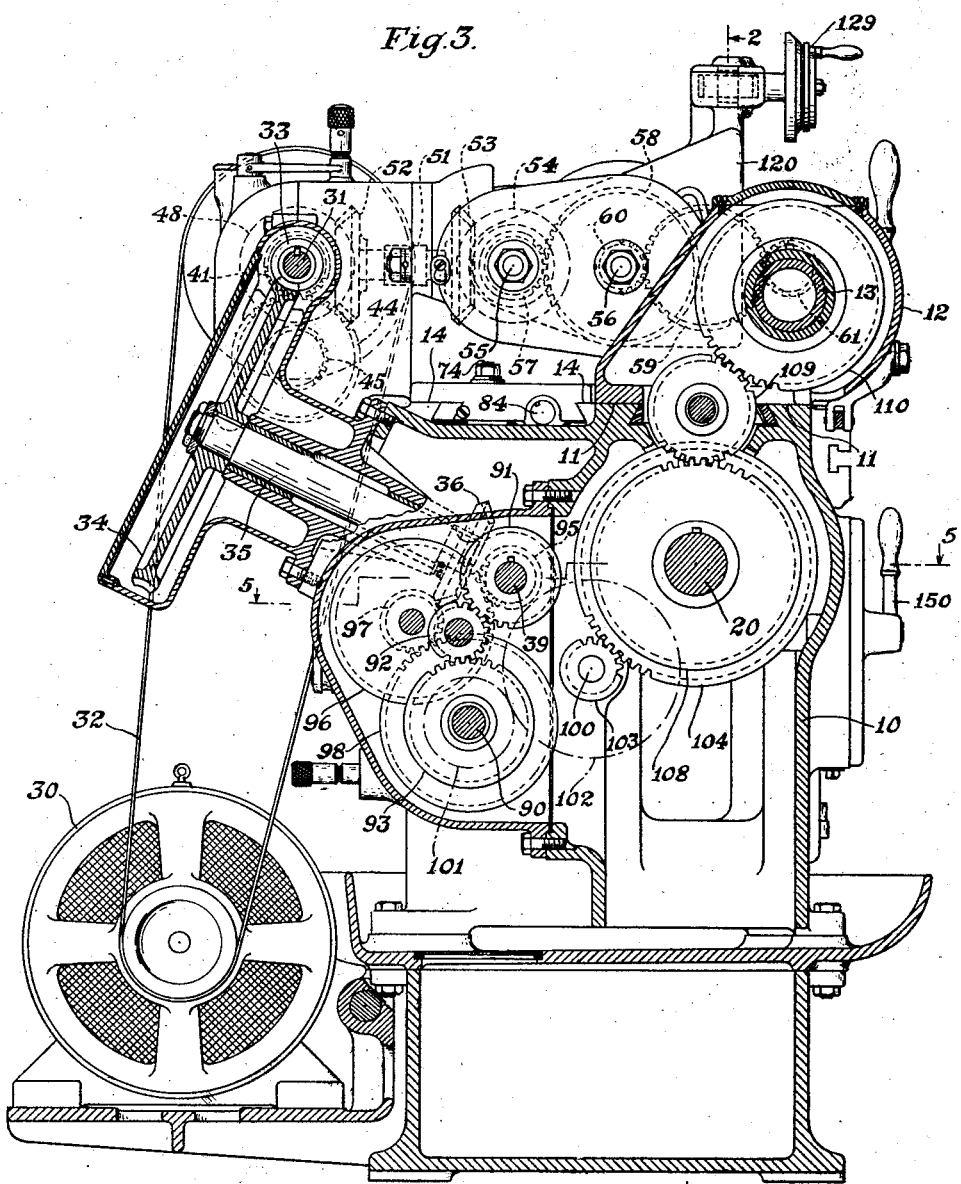

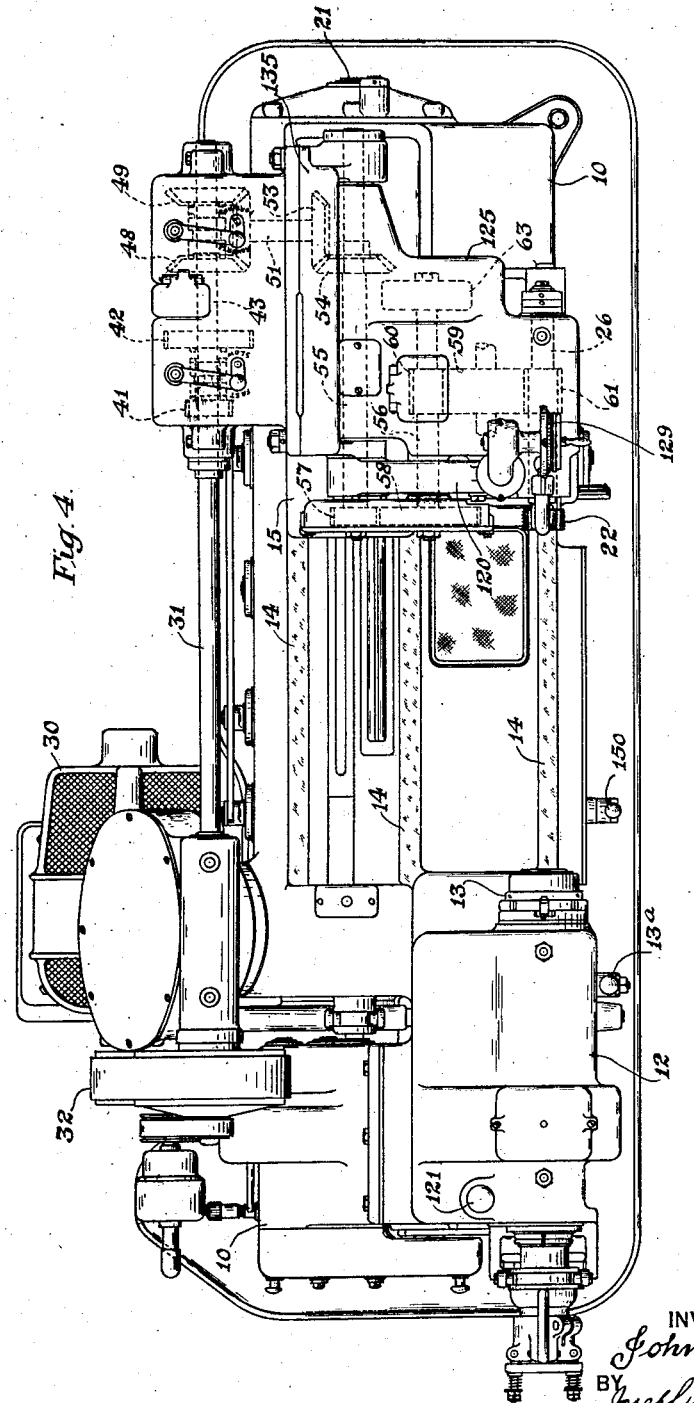

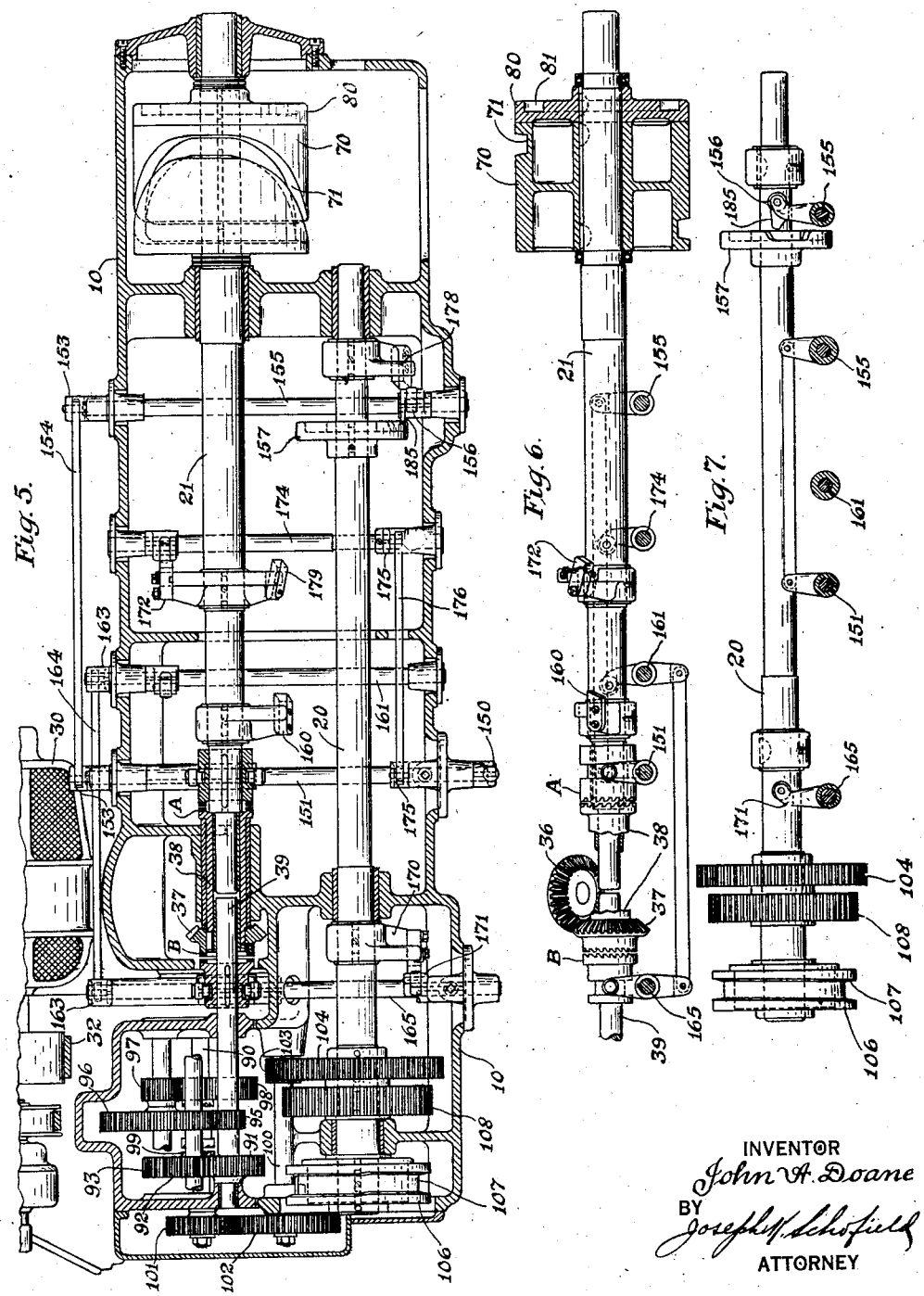

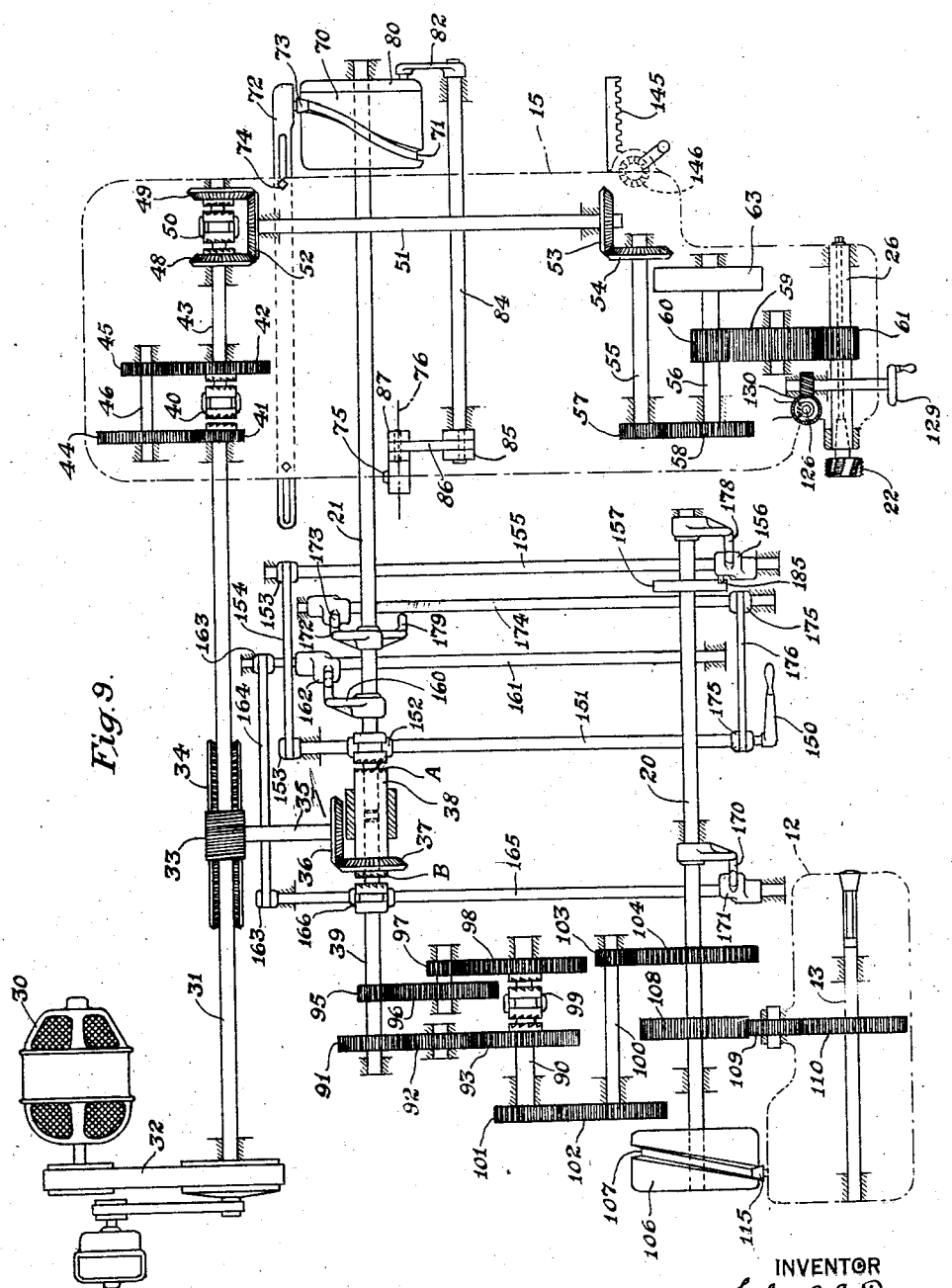

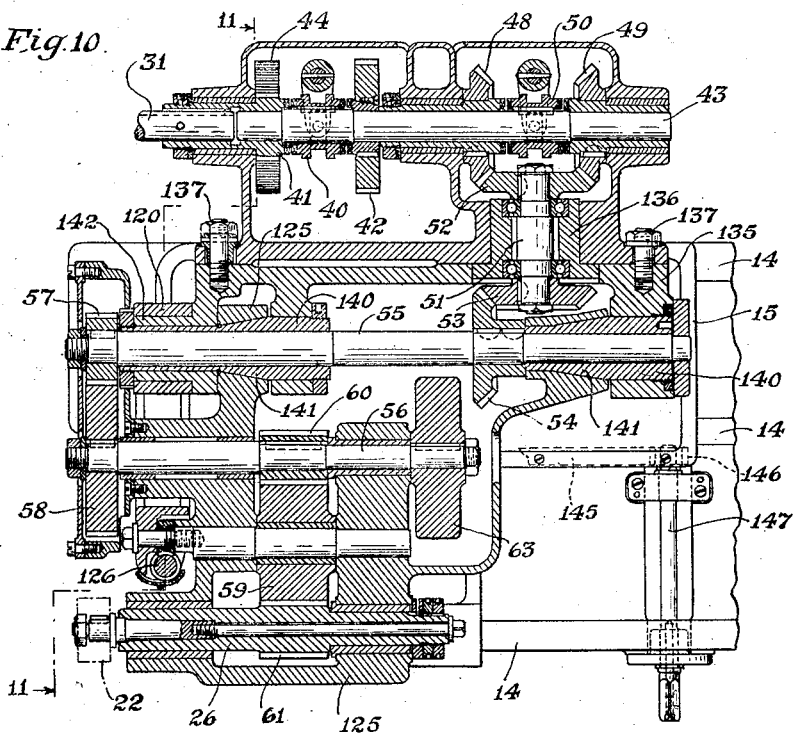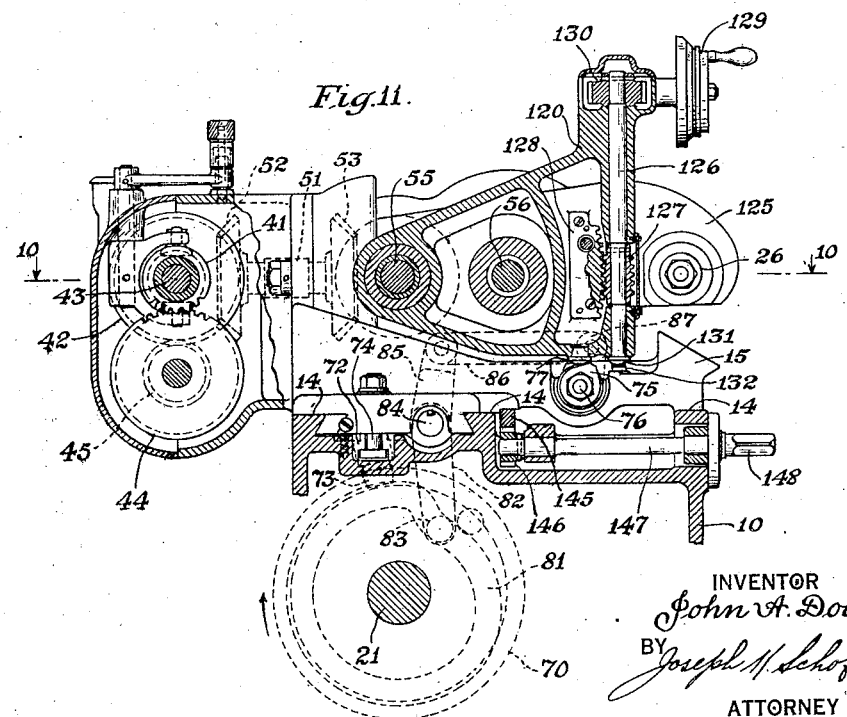

Feb. 22, 1927.
J. A. DOANE
1,618,275
MILLING LATHE
Filed Dec. 30, 1922      8 Sheets-Sheet 8
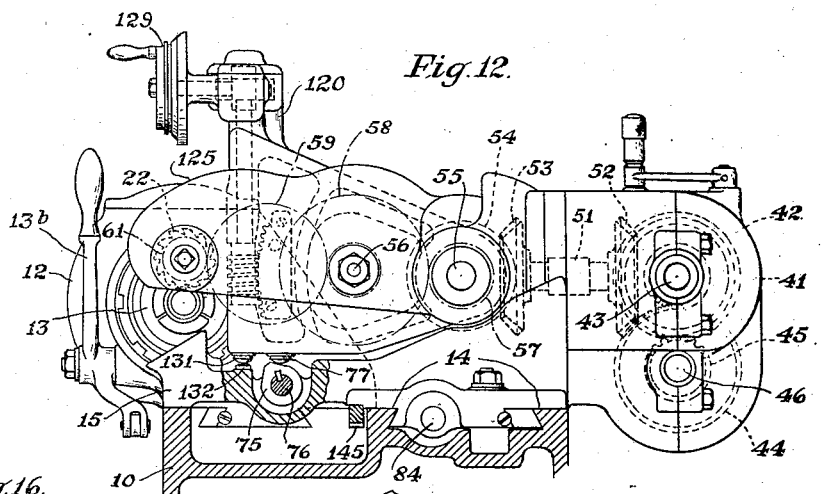
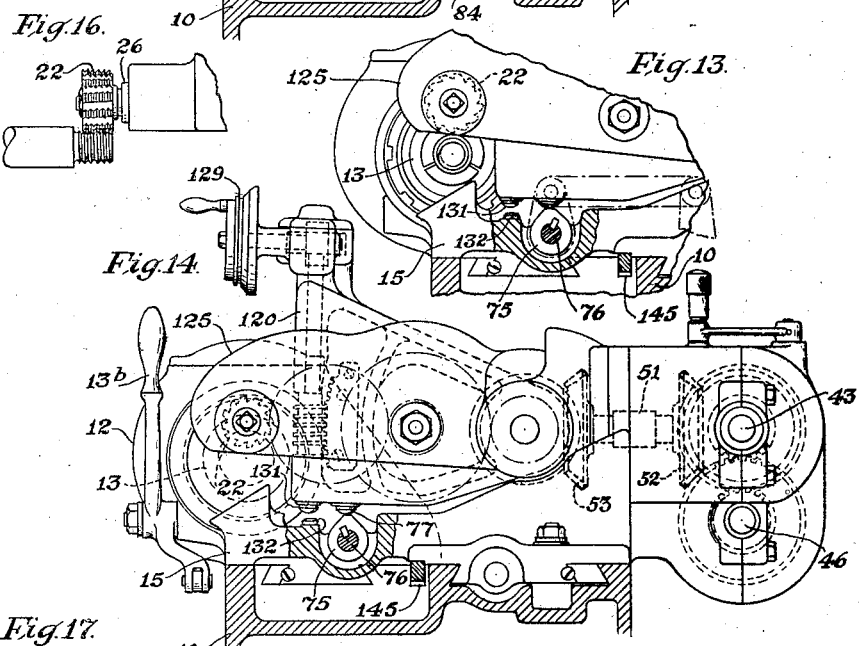
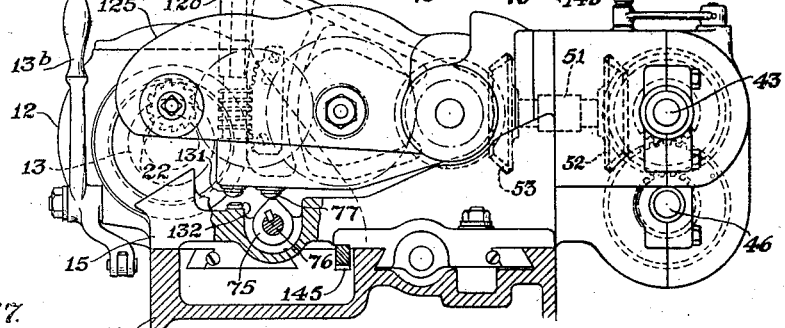
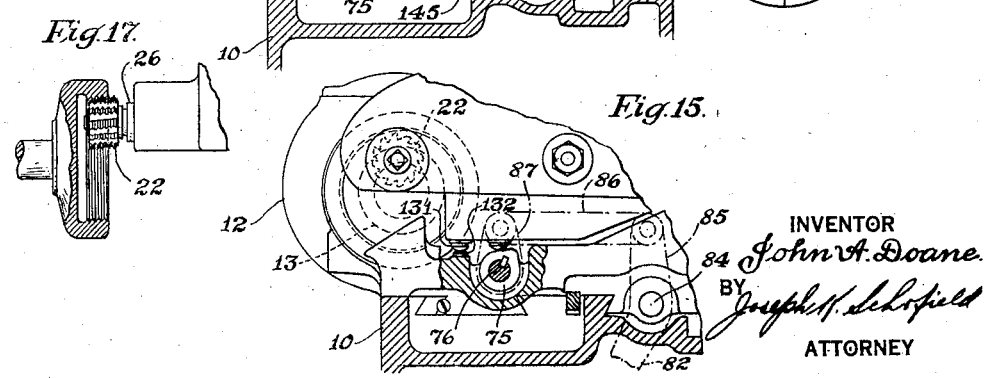
INVENTOR
John A. Doane.
BY
Joseph F. Schofield
ATTORNEY Patented Feb. 22, 1927.

1,618,275

UNITED STATES PATENT OFFICE.

JOHN A. DOANE, OF HARTFORD, CONNECTICUT, ASSIGNOR TO PRATT & WHITNEY COMPANY, OF NEW YORK, N. Y., A CORPORATION OF NEW JERSEY.

MILLING LATHE.

Application filed December 30, 1922. Serial No. 609,874.

This invention relates to thread hobbing machines and to special forms of milling machines. More in particular the invention relates to an automatic machine of this general type adapted to hob internal or external threads or to mill circular forms on either internal or external surfaces of an object.

An object of the present invention is to provide a thread hobbing or other form of machine adapted to hob or mill rotatable work which will be substantially automatic in its operation and which will enable identical threads or other forms with or without lead to be rapidly and accurately formed on either internal or external surfaces of a plurality of similar articles.

Another object of the invention is to provide a machine of the above character having a work spindle mounted in a headstock and adapted to be rotated, and also, when operating to hob threads, to be simultaneously advanced axially a slight distance in accordance with the lead of the thread being formed. These movements of the work spindle are preferably automatically controlled in timed relation to axial and transverse movements of the rotatable cutter by means of suitable cams Also, it is an object of the invention to provide a movable cutter carriage of novel form carrying a thread or other type of rotatable cutter. This cutter carriage is manually adjustable along the bed and also automatically actuated during operation to advance the cutter into operative position axially and radially relative to the work.

Another object of the invention is to provide a cutter head for the rotatable cutter which may be held in engagement with the work by gravity or positively depending upon the type of work, and adapted to be disengaged from the work by suitable automatically operating cam means, so that when the work is completed, the cutter will be automatically withdrawn from the work, thus enabling it to be retracted longitudinally along the bed.

Another object of the invention is to provide means to adjust the position of the cutter head for operating upon either internal or external work and on work of different sizes. While working upon external work the cutter is preferably positioned above the work so that it may rest thereon by its weight and that of its adjacent parts. In working on internal work the cutter is preferably positioned to engage the upper portions of the surface being operated on and be held positively in engagement therewith.

Another principal object of the present invention is to provide a special control mechanism for the operative movements of the work spindle and the cutter spindle so that they may be automatically operated in accordance with a predetermined cycle. This mechanism, preferably, and in the form shown, comprises two main cam shafts each carrying a drum cam and also having dogs thereon to control the operations of the main clutches to start and stop rotation of these shafts.

Another object of the invention is to provide manual means to start the machine in operation at the beginning of its cycle of operation and provide means preventing any interruption to that cycle of operation until it has been completed.

Another object of the invention is to provide adjusting means for the tool or cutter spindle relative to an oscillating bracket or frame, preferably this comprises an oscillatory member or cutter head which may be suitably positioned relatively to the bracket or frame for operating upon work of different diameters and adjustable for operation upon either external or internal work. Cam means to oscillate the bracket or frame are provided to engage and disengage the cutter with the work.

With these and other objects in view, my invention consists in the features of construction and operation set forth in the following specification and illustrated in the accompanying drawings.

In the accompanying drawings annexed hereto and forming a part of this specification, I have shown my invention embodied in an automatic thread hobbing or milling machine but it will be understood that the invention can be otherwise embodied and that the drawings are not to be construed as defining or limiting the scope of the invention, the claims appended to this specification being relied upon for that purpose.

In the drawings:

Figure 1 is a front elevation of the complete machine, the thread cutting tool being shown in its retracted position.

Fig. 2 is a vertical sectional view of the complete machine taken longitudinally through the base.

Fig. 3 is an end view of the machine taken on line 3—3 of Fig. 2 and looking in the direction of the arrows.

Fig. 4 is a plan view of the complete machine.

Fig. 5 is a horizontal sectional view of the base showing the two parallel cam shafts by means of which the operating mechanisms of the machine are controlled.

Fig. 6 is an elevation of one of the cam shafts and its cooperating parts.

Fig. 7 is a similar view of the other cam shaft.

Fig. 8 is a detail view of an interlocking mechanism forming part of this invention.

Fig. 9 is a diagrammatic view of the operating mechanism.

Fig. 10 is a horizontal sectional view of the cutter carriage and parts carried thereby taken on line 10—10 of Fig. 11.

Fig. 11 is a side elevation partly in section taken on line 11—11 of Fig. 10.

Fig. 12 is a side elevation of the cutter carriage and head looking towards the headstock, the cutter being shown in operative position for external work.

Fig. 13 is a view similar to Fig. 12 with the cutter in its inoperative position for external work.

Fig. 14 is a view similar to Fig. 12 with the cutter in its operative position for internal work.

Fig. 15 is a view similar to Fig. 14 with the cutter in inoperative position for internal work.

Fig. 16 is a diagrammatic view in elevation of the cutter in position for operating on external work, and Fig. 17 is a similar view of Fig. 16 with the cutter in operative position relative to internal work.

In the above mentioned drawings, I have shown but one modification of the invention forming practically a universal thread hobbing and internal and external contour milling machine which is now deemed preferable but it is to be understood that changes and modifications may be made within the scope of the appended claims without departing from the spirit of the invention.

Briefly, my invention in its broadest aspect comprises the following principal parts: First, a base on which is mounted a headstock carrying a rotatable work spindle, this headstock or carriage being so mounted that it may be given a slight axial movement, preferably by means of a cam; second, a cutter carriage slidably mounted on the base and adapted to carry a thread hobbing or other form of rotatable milling cutter; third, cam means to advance this carriage axially along the base; fourth, means on the carriage and actuated by means of a suitable cam to automatically move the cutter into and out of engagement with the work in a direction normal to the work axis; fifth, manual adjusting means to position the cutter for varying diameters and types of work; sixth, a cam shaft having a peripheral cam thereon adapted to control the axial movements of the work carrying spindle; seventh, another cam shaft preferably lying adjacent and parallel to the first cam shaft adapted to control the movements of the cutter carriage and its cooperating parts; and eighth, means to actuate the two cam shafts in timed relation to each other to cause the operative movements of the cooperating parts and mechanisms to be accomplished in accordance with a predetermined timed relation or cycle.

Referring more particularly to the figures of the drawings wherein a preferred form of the invention is shown, the base of the machine 10 is provided with suitable ways 11 near one end on which may be slidably mounted a headstock 12. In this headstock 12 is mounted the work rotating spindle 13 which may be provided with a collet 13$^a$ or other form of work gripping mechanism. This preferably may be operated by means of a hand lever 13$^b$. Other ways 14 also on the upper horizontal surface of the base 10 are provided on which the cutter carriage 15 may be slidable longitudinally of the machine. Within the base 10 are two main cam shafts 20 and 21 extending longitudinally of the base and adapted for controlling the longitudinal positions of the headstock 12, the cutter carriage 15 and the radial position of the rotatable milling cutter 22 relative to the work axis. On these main cam shafts 20 and 21 are provided clutch operating means in the form of dogs presently to be described whereby the two cam shafts are started and stopped in accordance with a predetermined cycle of operations. These clutch operating means and their control levers and dogs are shown clearly in Figs. 5, 6 and 7 and in the diagrammatic view Fig. 9 so that their operation will be described in connection with these figures.

As the machine is primarily designed to operate as a thread hobbing machine, the mechanism and its cycle of operation will be described particularly with this function in view. It will be understood, however, that many other operations can be carried out with this mechanism with but slight modifications.

The main operative parts of the machine comprise a work spindle 13 which is rotatably mounted in the headstock 12, and a rotatable cutter spindle 26 on which is mounted the cutter 22. This cutter 22 and its spindle 26 are movable longitudinally and normally of the base in its carriage 15. Preferably the rotation of the work spindle 13 and the axial movement thereof are both accomplished from the same shaft, preferably the main cam shaft 20. Means also are provided to rotate the spindle 13 slightly more than one revolution during approximately one complete revolution of this cam shaft 20 and during each cycle of operations. Simultaneously during this rotation of the work spindle 13, the headstock 12 is moved longitudinally to form the lead of the thread if a screw thread is being formed. It will be understood that when the machine is being used for milling operations upon other than threaded work, there will be no axial movement of the headstock 12.

The main drive for the machine whereby all the operative movements of the parts are accomplished preferably comprises a motor 30 which may be mounted on or adjacent the base 10. This motor 30 is in driving relation with a main power shaft 31 in rear of the machine through a belt or other driving connection 32. On the main driving shaft 31 is a main driving worm 33 in mesh with a worm wheel 34 mounted on a shaft 35 extending forward and downward relative to the base 10 of the machine. It is from this worm 33 and worm wheel 34 that the rotative and axial movements of the work spindle 13 are obtained. From this worm 33 and worm wheel 34 also the axial and radial positions of the cutter spindle 26 are varied during operation of the machine. On the forward end of the shaft 35 to which the worm wheel 34 is fastened is a bevel gear 36. This bevel gear 36 is in mesh with a corresponding bevel gear 37 mounted upon a short sleeve 38. The short sleeve 38 comprises the intermediate member of a pair of clutches designated by A and B. Preferably, as shown, the ends of this sleeve 38 are formed with serrated teeth adapted to positively engage corresponding teeth on the complementary clutch members forming respectively the clutches A and B, so that, when in operative position, the clutches A and B positively drive their respective shafts.

Referring to the diagrammatic view (Fig. 9) this construction will be clear. Preferably, the sleeve 38 is rotatably mounted over the contiguous ends of two shafts in alignment within the base 10. One of these shafts is the cam shaft 21 and the other a shaft 39 from which the other main cam shaft 20 is rotated. The clutch A, one member of which is splined to shaft 21 and the other formed by the sleeve 38, serves to rotate the cam shaft 21 when in its closed or operative position. In a similar manner clutch B serves to rotate its shaft 39 when in its operative position and through driving connection which presently will be described rotates the cam shaft 20.

It will be seen from the above, as the sleeve 38 is directly connected to the motor 30 or other driving member, that so long as the motor is operated the sleeve 38 will be constantly rotated. With the exception of the means for rotating the cutter 22, the cooperative mechanisms of the machine are all operated in accordance with a predetermined cycle from this sleeve 38. These mechanisms are controlled so as to be started and stopped by the automatic opening and closing of the clutches A and B cooperating with sleeve 38.

Also on the main drive shaft 31 are the means for rotating the cutter 22 by means of its spindle 26. Preferably, near one end of this main driving shaft 31 is another pair of clutch members, the central member 40 of which is splined to an extension 43 to the main shaft 31 and lying in alignment therewith. This member 40 may be moved into mesh with a gear 41 rotatable with a sleeve splined to the main shaft 31 (see Fig. 10) or with another gear 42 rotatably mounted on the extension shaft 43. Each of these gears 41 and 42 is in mesh respectively with corresponding gears 44 and 45 mounted adjacent thereto and each fastened to a short drive shaft 46. Cooperating clutch members adapted to engage with the member 40 are mounted on the hubs of the gears 41 and 42. By moving the central clutch member 40 in either direction, the main driving shaft 31 is placed in driving relation to the extension shaft 43 in alignment therewith either directly or through the gears 44 and 45 on the short shaft 46. This permits the shaft 43 to be rotated at either of two different speeds and in the same direction.

With the clutch member 40 in one position, the extension 43 to the main drive shaft 31 is driven at the speed of the main drive shaft while with the clutch in the opposite position, it is driven at a greatly reduced speed through the reduction gearing comprising the gears 41, 42, 44, 45. The cutter driving connections are all driven from this extension shaft 43 and are preferably mounted, as shown, in rear of the cutter carriage 15 to which they are attached so as to move therewith. The drive shaft 31 also is splined to its driving means associated with the motor 30 so that it is moved axially with movements along the bed of the cutter carriage 15.

On the extension shaft 43 and also mounted on the cutter carriage 15 is a reversing mechanism comprising a pair of bevel gears 48 and 49 loosely mounted so as to be rotatable on shaft 43, either one of which may be positively connected thereto by engagement of a central clutch member 50 which is splined to the shaft. A shaft 51 having a bevel gear 52 fastened thereto and in mesh with bevel gears 48 and 49 may therefore be driven in either direction dependent upon the position of the clutch 50. Shaft 51 extends forwardly on the carriage 15 and is provided with a bevel gear 53 fastened on its forward end which is in mesh with a corresponding bevel gear 54 mounted on a short shaft 55 which drives another shaft 56 extending parallel thereto by means of a pair of spur gears 57 and 58. This shaft 56, through an idler gear 59, is in driving connection with a cutter spindle 26 through spur gears 60 and 61. The cutter spindle driven by the gears 60 and 61 may be provided at one end with the thread cutting hob 22 or other form of rotatable milling cutter particularly adapted for the work being operated on.

In order to vary the speed of the cutter spindle 26 in addition to the two different speeds obtained from the clutch 40 and gearing comprising the gears 41, 42, 44 and 45, the gears 57 and 58 are placed on the ends of their respective shafts 55 and 56 so that they may readily be removed and other gears of different sizes substituted. Also on one of the intermediate shafts, as for instance, shaft 56, a small fly wheel 63 may be placed to aid the cutting action and smoothness of operation of the cutter 22.

As it is necessary to move the cutter carriage 15 and its cutter 22 to advance it axially toward the work, particularly when the machine is operating upon internal screw threaded work, I provide a cam drum 70 mounted upon the cam shaft 21 and connected to the cutter carriage 15 by means of the adjustable connecting link or rod 72. The rotation of this cam shaft 21 as well as cam shaft 20 is controlled automatically by dogs thereon adapted to control the positions of the clutches A and B. By means of these dogs and clutches, the rotation of the shafts 20 ad 21 is started and stopped during the cycle of operations so that while the work spindle 13 is not rotating the cutter spindle 26 may be advanced axially toward its operative position. Also while the work is rotating, the cutter carriage 15 may be held from axial movement by reason of the form of the cam groove 71 with which the cam drum 70 is provided. The mechanism for controlling the operation of the cutter carriage 15 and parts mounted thereon will first be described.

Preferably, the adjustable connection between the cam drum 70 and the cutter carriage 15 comprises the elongated bar 72 which has a roller 73 depending from one end. This roller 73 is adapted to engage the cam groove 71 in cam 70 so that reciprocatory movements are imparted to this rod 72 by rotation of the cam 70. The bar or rod 72 is also provided with an elongated slot adapted to retain bolts 74 by means of which the carriage 15 may be adjustably secured to the bar. By securing the cutter carriage 15 to the bar 72 at different portions thereof, the position of the carriage 15 may be varied for different lengths of work. In any position of adjustment the advancing movement of the carriage 15 into and out of its longitudinal operative position is that obtained from the cam groove 71. This movement is required to advance the cutter 22 accurately to a predetermined adjustable position relative to the work and to retract the cutter $22^a$ sufficient distance to permit the operator to remove work and reload work on the work spindle 13.

In addition to the axial or longitudinal movement of the cutter carriage 15 to advance or retract the cutter 22 and its mountings toward or from operative position, it is necessary to move the cutter 22 in a direction normal to its axis into and out of cutting depth in the work. This normal or radial movement of the cutter 22 must be sufficient to move the cutter into full cutting depth in the work as soon as the mechanism is in position for operation and, on its return movement, must serve to completely disengage the cutter 22 from the work. I therefore provide a small cam 75 removably mounted upon the end of a shaft 76 extending in a direction parallel to the cutter spindle 26. This small cam 75, in one position, is adapted to hold the cutter 22 and cutter spindle 26 in its inoperative position and, as soon as the cutter is moved axially into operative position, the cam 75 is rotated to vary the radial position of the cutter relative to the axis of the work. The cam 75 contacts with a bearing plate 77 provided on the lower surface of the oscillatory member on which the spindle 26 is mounted.

To actuate this cam 75 to oscillate the cutter spindle 26 periodically during the cycle of operation, a face cam 80 on the cam drum 70 is provided, the form of its groove being such that at one point it forces the cam 75 to rotate through a small angle and, at another point, to return to its initial position. This cam 80 as well as cam 75 is preferably made in such a manner that it may be made use of when the machine is being used either for external or internal threading or other operations.

At the present preferred form of the machine is designed for both external and internal screw threaded or other work, it is necessary to move the cutter spindle 26 in opposite directions to move it respectively into and out of cutting depth dependent on whether the work being operated on is external or internal. For external work, the operative position of cam 75 and the cutter spindle 26 are shown clearly in Fig. 12, the corresponding inoperative position of the cam 75 for external work being shown in Fig. 13. From this it will be seen that while the cutter 22 is positively held out of engagement from the work in its inoperative position, as soon as cutting is to be started, the cam 75 is rotated slightly thus permitting the cutter spindle 22 with its connected parts to drop slightly. During operation upon external surfaces, therefore, the cutter is held down to its working depth by the weight of parts associated with this spindle 22.

While operating upon internal work, the cutter 22 is elevated into and held positively into cutting depth in the work. During the inoperative period it is permitted to drop slightly out of engagement from the work. The operative position of the work spindle 22 while operating on internal work is shown in Fig. 14 and the corresponding inoperative position for internal work is shown in Fig. 15.

The connections for operating this depth cam 75 from the groove 81 on the face cam 80 fastened to one face of drum 70 are shown clearly in the drawings in Figs. 9 and 11. A lever 82, one end of which is provided with a roller 83, engages the cam groove 81 and is mounted on an oscillating shaft 84. This shaft 84 is splined substantially throughout its length and is engaged by a short lever 85 retained so as to move axially with the cutter carriage 15. On this lever 85 is pivotally attached a reach arm 86, the opposite end of which is attached to a lever 87 on the same shaft 76 with the depth cam 75.

Oscillation therefore of the shaft 84 induced from the cam groove 81 and the connections above described periodically oscillates the depth cam 75 into and out of operative position. It will be understood that the form and angular position of the cam groove 81 is such that the movements of this depth cam 75 occur at the proper points in the cycle of operations. These movements of the cutter 22 into and out of operative position occur at exactly the same points in the cycle of operation when the machine is operating either on internal or external threads, so that the above described mechanism may be used for either external or internal work. The cam 75 must however be disposed to move the cutter spindle 26 in one direction for internal work and in exactly the opposite direction at the same point in the cycle for external work. For this purpose the depth cam 75 is provided with a keyway adapted to engage a key inserted in shaft 76 angularly spaced slightly from its projection. In one position of the cam 75 on its shaft 76 therefore, the cutter spindle 26 is raised by oscillatory movement of the cam 75 and shaft 76 in one direction while in its opposite position, oscillation of the shaft 76 in the same direction serves to lower the spindle 26. By placing the cam 75 on its shaft 76 with one face outward for external work and the other face outward for internal work, it is adapted for controlling the cutter spindle 26 to move it toward and from the work axis at the proper points in the cycle of operation for either internal or external operations.

The axial movements of the head stock 12 and the rotation of the work spindle 13 which takes place in timed relation to the above described movements of the cutter spindle 26 will now be described.

Preferably, the rotation of the work spindle 13 and its axial movement by reason of the movement of the headstock 12 during operation are both obtained from positive driving connections extending from the main driving sleeve 38 above referred to. These driving connections for rotating this spindle 13 comprise the shaft 39 coaxially mounted with said sleeve 38 and which is adapted to drive another shaft 90 at either of two different speeds in the same direction, this being accomplished through two sets of gearing. One of these sets of gearing comprising gears 91, 92 and 93 has a simple idler 92 introduced therein. The other driving connection comprising gears 95, 96, 97, 98 has a compound gear 96–97 whereby the speed of the driven shaft 90 is greatly reduced. Gears 93 and 98 are rotatably mounted on the shaft 90 and either may be placed in driving relation thereon by means of the clutch member 99 disposed between them. This clutch member 99 is splined to the shaft 90. In driving relation with this shaft 90 is another shaft 100 extending parallel thereto which is driven therefrom by a pair of spur gears 101 and 102. The shaft 100 also has a pinion 103 thereon in intermeshing relation with a gear 104 on cam shaft 20. It is by means of the rotation of this cam shaft 20 that the rotation of work spindle 13 and axial movement of the headstock 12 are accomplished.

On cam shaft 20 is a drum cam 106 for axially advancing the work spindle 13 by means of its cam groove 107. A spur gear 108 on cam shaft 20 drives the work spindle 13 through an idler 109 and another gear 110, gear 110 being fastened directly to the work spindle 13. The ratio of these latter gears 108 and 110 is such that they rotate the work spindle 13 slightly more than one revolution for one revolution of the shaft 20. It will be seen, therefore, that when the main power shaft 31 is rotating and with the clutch B in proper driving position, the work spindle 13 may be rotated at either of two different speeds and, simultaneously with this rotation of the work spindle 13, it together with the headstock 12 will be moved axially by means of the peripheral groove 107 on the drum cam 106.

The cam drum 106 for controlling the longitudinal movements of the headstock 12 is provided with the groove 107 on its cylindrical surface designed for the particular work being operated on and which is adapted to be engaged by a pin or roller 115 mounted vertically within the headstock 12. As a particular form of cam groove 107 and cam 106 is required for each lead of the screw threads formed by the machine, the cam drum 106 is adapted to be readily changed. For this purpose the cam portion of the drum 106 is made in the form of an annular ring 116 adapted to be fitted over a hub 117 permanently fastened to the shaft 20. A key within the hub 117 provides means for non-rotatably mounting the cam ring 116 and a clamping bolt 119 prevents it from accidentally being removed.

As the pin 115 engaging the cam groove 107 must be removed each time the cam 106 is changed, this pin 115 is retained in its recess within the headstock 12 in a manner to be vertically movable. A spring 122 surrounding the pin 115 forces its lower end into engagement with the cam groove 107. By means of a knob 121 on the upper end of the pin 115 extending through the headstock 12, this pin 115 may be manually withdrawn while the cam 106 is being changed.

On the tool carriage 15 is a swinging bracket or frame 120 this frame being adapted to be swung about an axis of the spindle driving shaft 55 shown in Figs. 10 and 11. Supported on the forward portion of this swinging frame 120 in a manner presently to be described is the cutter spindle 26 which is oscillated into and out of operative position by the movements of this bracket or frame 120. As the cutter spindle 26 must be adjusted to different positions from the axis of the work spindle 13 for different types and diameters of work, I provide an adjustment for the cutter spindle 26 and its head 125 relative to the bracket or frame 120.

The cutter head 125 preferably is adapted to oscillate about the shaft 55 the same as the bracket or frame 120 so that it may oscillate with movements of the bracket or frame 120 without interruption of the driving connections for the cutter spindle 26. During operation the cutter head 125 must be held in fixed position relative to the bracket 120 and accurate means for setting the head 125 for different diameters of work must be provided. These in their preferred form comprise a vertically mounted rotatable shaft 126 having a worm 127 thereon. This shaft 126 is mounted in the oscillating cutter head and the worm 127 engages with a small section of a worm gear 128 mounted on the swinging bracket or frame 120. Rotation of the vertically mounted shaft 126 and its worm 127 by means of the graduated dial hand wheel 129 operating through gears 130 as shown in Figs. 9 and 11, elevates or depresses the axis of the cutter spindle 26 and the cutter head 125 relative to the position of the bracket 120.

This adjustment of the cutter head 125 relative to the bracket 120 is used exclusively for adjusting the cutter 22 to operate on different diameters of work and to position the cutter correctly for external or internal work. The movement of the cutter 22 into and out of depth in the work during the cycle of operations is accomplished by means of the small cam 75 above described, rotative movement of which oscillates the bracket 120 on the cutter carriage 15. Also, as the cutter head 125 is mounted to oscillate and is attached to the bracket 120 through the worm 127 and segment of worm gear 128, this head 125 is simultaneously oscillated with the bracket 120.

As it is essential when operating on external work to prevent the cutter 22 from entering too deeply into the work, the bracket member 120 is provided with a hardened bearing member 131 adapted to contact with a small plate 132 set into the cutter carriage 15 when the cutter is in operative position relative to the external work being operated on. While operating on internal work the operative position of the bracket 120 and cutter head 125 is such that the bearing member 131 and plate 132 are out of contact. When the bracket or frame 120 moves to its inoperative position for internal work, these members 131 and 132 are brought into contact.

It is also essential or at least desirable to provide some means for adjusting the axis about which the cutter spindle 26 rotates. This is for the purpose of setting the axis of the cutter 22 so that it will accurately cut the desired form. Also, this adjustment may be used to permit slightly different forms, as slightly tapered or straight threads, being formed with the same cutter. A plate or frame member 135 is therefore provided mounted on the cutter carriage 15 which serves as a pivotal support for the bracket 120 and its attached parts. This plate may be angularly adjusted about the axis of the stud shaft 51, a bearing member 136 being provided for this purpose. Studs or bolts 137 passing through accurate slots in rear of the cutter carriage 15 and threaded into the plate 135 provide means for securely fastening this plate 135 in any desired angular adjustment. As the stud shaft 51 extends through the axis of the bearing member 136 on which the bracket 120 oscillates the driving connections for the cutter spindle 26 are not interrupted by adjustment of this plate 135 to any angular position.

It will be seen in Fig. 10 that the adjustable plate 135 is provided with aligned bearing members 140 having conical portions 141 providing bearings for the cutter head 125. Preferably, and as shown in this figure, these members 140 also provide bearings for the driving shaft 55 which extends through them. Extending laterally from the adjustable plate 135 is a cylindrical projection 142. This provides a bearing about which the bracket or frame 120 may oscillate.

In order to facilitate the preliminary adjustments of the cutter carriage 15 during the setting up of the machine for operations on different types and lengths of work, I provide a rack 145 fixed to the lower surface of the cutter carriage 15. This is in mesh with a small pinion 146 on a forwardly extending shaft 147. The forward end of the shaft 147 is squared as at 148 so that by means of a suitable wrench the pinion 146 may be rotated to position the tool carriage 15 at any point along the ways 14 that may be desired. When the cutter carriage 15 has been positioned accurately into any predetermined axial position preparatory to operation, the cutter carriage 15 is clamped to the adjustable connecting rod 72 through which its movements are controlled from the cam groove 71 on cam drum 70.

The individual mechanisms have each been described, and now a short description of the cycle of operations will be given together with a description of the means whereby this cycle is accomplished. It will be understood that the specific cycle described is that for forming internal screw threads during which operation all of the above described mechanisms are made use of. In using the machine for forming external screw threads or other operations, some of the above described mechanisms are not essential or required and may therefore be made inoperative.

The complete cycle of operations for forming internal screw threads comprises; first, movement of the cutter carriage 15 into its longitudinal operative position; second, radial or normal movement of the cutter spindle 26 by oscillation of the bracket 120 so that the cutter 22 moves into depth in the work; third, rotation of the work spindle 13 through slightly more than a complete revolution while the cutter carriage 15 and spindle 26 are retained in their operative position; fourth, relative axial movement of the cutter 22 and work spindle 13 simultaneously with the rotation of the work spindle 13, this being accomplished by movement of the headstock 12 along the base 10; fifth, disengagement of the cutter 22 from depth by oscillation of the bracket 120 in the reverse direction; and sixth, return of the cutter carriage 15 longitudinally of the base to its original position. Preferably the machine is automatically stopped at the end of this operative cycle to permit the operator to remove completed work and reload the work spindle 13 with another blank. To actuate the machine in accordance with this predetermined cycle, a plurality of clutches and clutch operating mechanisms are made use of. These clutches are preferably operated by means of dogs mounted on the two cam shafts 20 and 21, the positions of the dogs being angularly arranged on their respective shafts so that the clutches are controlled in proper sequence and in accordance with a predetermined cycle. These parts are all shown diagrammatically in Fig. 9 and they will be described with particular reference to this diagrammatic view.

Upon movement movement of starting lever 150 to its vertical or operative position, the clutch indicated at A engages the main driving sleeve 38 so that the cutter cam shaft 21 is started to rotate. This is accomplished directly by this starting lever 150 which is mounted on an oscillating shaft 151 having a clutch operating yoke member 152 thereon. This shaft 151 through levers 153 and a connecting rod 154 is connected to a second oscillating shaft 155 having a lever 156 thereon adjacent a disk cam 157 on the work spindle cam shaft 20. The purpose of this latter cam 157 and parts engaging it will presently be described. This rotation of the cutter cam shaft 21 advances the cutter carriage 15 longitudinally of the base by means of the cam drum 70 and its cam groove 71 to advance the cutter 22 axially into its work engaging position. Also, rotation of this shaft 21 rotates the face cam 80 to oscillate cam 75 and oscillate the cutter 22 on the cutter head 125 into working depth by a slight movement normal to its axial movement.

The rotative movement of the cutter cam shaft 21 continues for a fraction of a revolution only. Just before it is stopped a clutch operating dog 160 thereon moves the clutch B into driving relationship with the opposite end of the driving sleeve 38. This is accomplished by means of an oscillatory shaft 161 having a lever 162 thereon engaging the dog 160. This oscillates the shaft 161 which, through levers 163 and connecting rod 164 oscillates shaft 165 on which is mounted the yoke 166 by means of which the clutch B is moved to its operative position. This occurs at a predetermined time during the rotation of cam shaft 21 by reason of the position of this latter clutch engaging dog 160. This starts the rotation of the work spindle cam shaft 20 which extends parallel with the cam shaft 21. Rotation of this work spindle cam shaft 20 rotates the lead cam 106 thereon to axially advance the work spindle 13 along the base 10. It also serves to positively rotate the work spindle 13 through driving connections described above. The specific mechanisms associated with the cam shaft 20 for advancing and rotating the work spindle 13 have each previously been fully described so that further description at this time will not be necessary. The simultaneous rotation and axial movement of the work spindle 13 continues so long as this cam shaft 20 continues its rotation. As soon as its single rotation is completed, it is stopped by a cam dog 170 on this cam shaft 20 striking a clutch operating arm 171 provided on oscillatory shaft 165 which disengages clutch B.

As soon as the work spindle cam shaft 20 has started its rotation, the cutter cam shaft 21 is stopped rotating by means of the dog 172 on cam shaft 21 striking a lever 173. Lever 173 is on an oscillating shaft 174 which through levers 175 and connecting rod 176 oscillates shaft 151 in a direction to disengage the clutch A. The cutter carriage 15 and cutter head 125 are therefore prevented from moving during rotation of the work spindle 13.

As soon as rotation of the work spindle 13 stops after completion of the thread or other milling operation, the cutter cam shaft 21 again must be started to disengage the cutter 22 from depth in the work and return the cutter carriage 15 to its initial inoperative position. This is accomplished by means of a clutch operating dog 178 on the work spindle cam shaft 20 so positioned that it will start the cutter cam shaft 21 rotating again just before the work spindle cam shaft 20 is stopped. The dog 178 is so placed on cam shaft 20 that it may engage and oscillate the lever 156 which, through oscillating shaft 155 and its connected parts, again moves the clutch A to its operative position. Finally, after completing this second rotation, the cutter cam shaft 21 is stopped by a dog 179 on the cutter cam shaft 21. The cam shaft 21 at the end of its second rotation has completed a full revolution, the first portion of which took place before the work spindle 13 started its rotation and the remainder of which took place after the rotation of the work spindle was completed. The first movement of the cutter cam shaft 21 positioned the cutter spindle 26 for operation and its latter movement returned the cutter 22 and its carriage 15 to initial position.

This completes the cycle of operation with each of the operative parts in their original positions so that with the work spindle reloaded, the machine is again ready for operation. It will be understood that any suitable means, not shown, may be made use of to retain the oscillating clutch operating shafts 165, 161, 174 and 155 in either of their operative positions.

It is essential in order to maintain the proper relative angular positions of the two main cam shafts 20 and 21 at all times during operation that these shafts be not stopped inadvertently during any portion of the cycle of operation. Stopping one of these cam shafts 20 or 21 inadvertently during parts of the cycle of operations would have the effect of destroying the synchronism of operation between the two cam shafts and thus necessitating resetting these cam shafts for additional operations. I therefore provide an interlocking mechanism preventing movement of the starting lever 150 during the major portion of the cycle of operation. This is shown diagrammatically in Fig. 9 and also in Figs. 2 and 8. This comprises principally the disk 157 previously referred to which is mounted on the cam shaft 20. This disk 157 has a portion of a circular projection 183 adjacent its periphery cut away on one of its faces as shown at 184. A projection 185 on the clutch operating lever 156 is positioned adjacent the periphery of this disk 157 so that movement of the lever 156 moves the projection 185 adjacent the extension 183 of disk 157. At all positions of the cam shaft 20 during the cycle of operations of the machine, the disk 157 is so formed that movement of the starting lever 150 is prevented but, when the cycle of operations has been completed, the portion of the disk or cam 157 which is cut away as at 184 is directly adjacent the projection 185 so that the starting lever 150 may be operated. After operations have been started, however, and cam shaft 20 has rotated slightly, movement of the starting lever cannot take place. This is for the reason that as soon as the actual cutting operation begins, which occurs when the cam shaft 20 is starting rotating, the cam shaft 21 is stopped. In stopping cam shaft 21 by disengaging its clutch A the lever 156 and the projection 185 are returned to their retracted position. In this position of the lever 156 the projection 185 just clears the face of the projection 184 on cam disk 157 so that movement of the starting lever 150 which would oscillate lever 156 is prevented except while the disk 157 is in its initial position.

It is necessary, therefore, to permit the machine to finish its complete cycle of operations by a complete rotation of cam shaft 20 before the starting lever can be again moved to its operative position. Also during the actual cutting operation and while the cam shaft 20 is rotating, the starting lever 150 is retracted in its inoperative position. This retractive movement of starting lever 150 takes place as soon as cam shaft 21 completes the first portion of its rotation and is stopped by engagement of lever 173 with the dog 172. After this stopping of cam shaft 21 takes place nothing can interrupt the completion of the cycle of operation of the machine.

What I claim is:

1. A milling lathe comprising in combination, a base, a headstock thereon having a rotatable work carrying spindle therein, means to axially advance the headstock along the base, a cutter carriage longitudinally movable along the base in a direction parallel to the movement of the headstock to position a cutter relative to the work, a cutter head thereon, a cutter spindle in said cutter head, means to rotate said cutter spindle, automatic means to vary the position of the cutter spindle toward or from the axis of rotation of the work spindle, and means to control the movements of the headstock and cutter head in accordance with a predetermined cycle.

2. A milling lathe comprising in combination, a base, a headstock thereon having a rotatable work carrying spindle therein, means to positively rotate the work spindle, means to axially advance the headstock along the base, a cutter carriage longitudinally movable along the base in a direction parallel to the movement of the headstock to position a cutter relative to the work, a cutter head thereon, a cutter spindle in said cutter head, means to rotate said cutter spindle, automatic means to vary the position of the cutter spindle toward or from the axis of rotation of the work spindle, and means to control the movements of the headstock and cutter head in accordance with a predetermined cycle and in timed relation with the rotation of the work spindle.

3. A milling lathe comprising in combination, a base, a headstock thereon having a rotatable work carrying spindle therein, means to axially advance the headstock along the base, a cutter carriage longitudinally movable along the base in a direction parallel to the movement of the headstock to position a cutter relative to the work, a cutter head thereon, a cutter spindle therein, means to rotate said cutter spindle, automatic means to vary the position of the cutter spindle toward or from the axis of rotation of the work spindle, and automatic cam operated means to control the movements of the headstock and cutter head in accordance with a predetermined cycle.

4. A milling lathe comprising in combination, a base, a headstock thereon having a rotatable work carrying spindle therein, means to positively rotate the work spindle, means to axially advance the headstock along the base, a cutter carriage longitudinally movable along the base in a direction parallel to the movement of the headstock to position a cutter relative to the work, a cutter head thereon, a cutter spindle therein, means to rotate said cutter spindle, automatic means to vary the position of the cutter spindle toward or from the axis of rotation of the work spindle, and automatic cam operated means to control the movements of the work spindle and cutter head in accordance with a predetermined cycle and in timed relation with the rotation of the work spindle.

5. A milling lathe comprising in combination, a base, a headstock thereon having a rotatable work carrying spindle therein, means to axially advance the headstock along the base, a cutter carriage longitudinally movable along the base in a direction parallel to the movement of the headstock to position a cutter relative to the work, a cutter head thereon, a cutter spindle therein, means to rotate said cutter spindle, automatic means to vary the position of the cutter spindle toward or from the axis of rotation of the work spindle, automatic means to vary the position of the cutter carriage along the base, and means to control the movements of the headstock, cutter carriage, and cutter head in accordance with a predetermined cycle.

6. A milling lathe comprising in combination, a base, a headstock thereon having a rotatable work carrying spindle therein, means to positively rotate the work spindle, means to axially advance the headstock along the base, a cutter carriage longitudinally movable along the base in a direction parallel to the movement of the headstock to position a cutter relative to the work, a cutter head thereon, a cutter spindle therein, means to rotate said cutter spindle, automatic means to vary the position of the cutter spindle toward or from the axis of rotation of the work spindle, automatic means to vary the position of the cutter carriage along the base, and means to control the movements of the headstock, cutter carriage, and cutter head in accordance with a predetermined cycle and in timed relation with the rotation of the work spindle.

7. A milling lathe comprising in combination, a base, a headstock slidable thereon having a rotatable work carrying spindle therein, a cutter carriage movable along the base, an oscillatory cutter head on said carriage, a rotatable cutter spindle in said head, automatic means to advance the cutter carriage toward the headstock, automatic means to oscillate the cutter head to move the cutter into and out of depth in the work, and means to advance the headstock uniformly while the work spindle is rotated, all of said means being operated in accordance with a predetermined cycle.

8. A milling lathe comprising in combination, a base, a headstock slidable thereon having a rotatable work carrying spindle therein, a cutter carriage movable along the base, an oscillatory cutter head on said carriage, a rotatable cutter spindle in said head, automatic means to advance the cutter carriage toward the headstock, automatic means to oscillate the cutter head to move the cutter into and out of depth in the work, said cutter head being adjustable for different diameters of work, and means to advance the headstock uniformly while the work spindle is rotated, all of said means being operated in accordance with a predetermined cycle.

9. A milling lathe comprising in combination, a base, a headstock slidable thereon having a rotatable work carrying spindle therein, a cutter carriage movable along the base, an oscillatory cutter head on said carriage, a rotatable cutter spindle in said head, automatic means to advance the cutter carriage toward the headstock, automatic means to oscillate the cutter head to move the cutter into and out of depth in the work, and means to advance the headstock uniformly while the work spindle is rotated, all of said means being cam operated in accordance with a predetermined cycle.

10. A milling lathe comprising in combination, a base, a headstock slidable thereon having a rotatable work carrying spindle therein, a cutter carriage movable along the base, an oscillatory cutter head on said carriage, a rotatable cutter spindle in said head, automatic means to advance the cutter carriage toward the headstock, said means being adjustable for different lengths of work, automatic means to oscillate the cutter head to move the cutter into and out of depth in the work, and means to advance the headstock uniformly while the work spindle is rotated, all of said means being operated in accordance with a predetermined cycle.

11. A milling lathe comprising in combination, a base, a headstock slidable thereon having a rotatable work carrying spindle therein, a cutter carriage movable along the base, an oscillatory cutter head on said carriage, a rotatable cutter spindle in said head, automatic means to advance the cutter carriage toward the headstock, automatic means to oscillate the cutter head to move the cutter into and out of depth in the work, and cam operated means to advance the headstock uniformly while the work spindle is rotated through slightly more than one revolution, said means being operated in accordance with a predetermined cycle.

12. A milling lathe comprising in combination, a base, a headstock thereon having a rotatable work carrying spindle therein, a cutter carriage movable along the base, an oscillatory cutter head on said carriage, a rotatable cutter spindle in said head, a pair of cam shafts having cams thereon for controlling the movements of the cutter carriage and cutter head, and means to rotate said cam shafts to control the operation of said cutter carriage and cutter head in accordance with a predetermined cycle.

13. A milling lathe comprising in combination, a base, a headstock slidable thereon having a rotatable work carrying spindle therein, a cutter carriage movable along the base, an oscillatory cutter head on said carriage, a rotatable cutter spindle in said head, a pair of cam shafts having cams thereon for controlling the movements of the headstock, cutter carriage and head, and means to rotate said shafts to control the operation of said headstock, cutter carriage and cutter head in accordance with a predetermined cycle.

14. A milling lathe comprising in combination, a base, a headstock slidable thereon having a rotatable work carrying spindle therein, means to positively rotate said work spindle, a cutter carriage movable along the base, an oscillatory cutter head on said carriage, a rotatable cutter spindle in said head, a pair of cam shafts having means thereon for controlling the movement of the headstock, the rotation of the work spindle, and movement of the cutter carriage and cutter head, and means to rotate said shafts to control the operation of said headstock, work spindle, cutter carriage and head in accordance with a predetermined cycle.

15. A milling lathe comprising in combination, a base, a headstock slidable thereon having a rotatable work carrying spindle therein, a cutter carriage movable along the base, an oscillatory cutter head on said carriage, a rotatable cutter spindle in said head, a pair of cam shafts having cams thereon for controlling the movements of the headstock, cutter carriage and head, and means to start and stop rotation of said shafts to control the operation of said headstock, cutter carriage and cutter head in accordance with a predetermined cycle.

16. A milling lathe comprising in combination, a base, a headstock slidably mounted thereon having a rotatable work carrying spindle therein, a cutter carriage movable along the base, an oscillatory cutter head on said carriage, a rotatable cutter spindle in said head, a pair of cam shafts having cams thereon for controlling the movements of the headstock, work spindle, cutter carriage and cutter head, two independently operated clutches adapted to rotate said shafts, and means on said cam shafts to control the operation of said clutches to operate the headstock, work spindle, cutter carriage and cutter head in accordance with a predetermined cycle.

17. In a milling lathe, in combination, a base, a cutter carriage adapted to be slidably mounted on said base, a pivotally mounted bracket or frame thereon, cam means to oscillate said frame, a cutter head on said frame having a rotatable cutter spindle therein, the axis of which is parallel to the direction of movement of the carriage, means to adjust the radial position of said head relative to said frame, and means to rotate the cutter spindle.

18. In a milling lathe, in combination, a base, a cutter carriage adapted to be slidably mounted on said base, a pivotally mounted bracket or frame thereon adapted to oscillate about an axis parallel with said base, cam means to oscillate said frame, a cutter head on said frame having a rotatable cutter spindle therein, the axis of which is parallel to the direction of movement of the carriage, means to adjust the radial position of said head relative to said frame, means to rotate the cutter spindle, and means to control the oscillatory movements of said bracket in timed relation to the sliding movement of said carriage.

19. In a milling lathe, in combination, a base, a cutter carriage adapted to be slidably mounted on said base, a pivotally mounted bracket or frame thereon, cam means to oscillate said frame, a cutter head on said frame having a rotatable cutter spindle therein, worm and worm wheel means to adjust the position of said head relative to said frame, and means to rotate the cutter spindle.

20. In a milling lathe, in combination, a base, a cutter carriage adapted to be slidably mounted on said base, a pivotally mounted bracket or frame thereon, cam means to oscillate said frame, a cutter head on said frame having a rotatable cutter spindle therein, means to adjust the position of said head relative to said frame, means to adjust the angular position of said bracket and head relative to the carriage, and means to rotate the cutter spindle.

21. In a milling lathe, in combination, a base, a cutter carriage adapted to be slidably mounted on said base, a pivotally mounted bracket or frame thereon adapted to oscillate about an axis parallel with said base, cam means to oscillate said frame, a cutter head on said frame having a rotatable cutter spindle therein, means to oscillate said head relative to said frame about the same axis as said frame, and means to rotate the cutter spindle.

22. In a milling lathe, in combination, a base, a cutter carriage adapted to be slidably mounted on said base, an angularly adjustable plate member on said carriage, a pivotally mounted bracket or frame on said plate member, cam means to oscillate said frame, a cutter head on said frame having a rotatable cutter spindle therein, means to oscillate said head relative to said frame, and means to rotate the cutter spindle.

23. In a milling lathe, in combination, a base, a cutter carriage adapted to be slidably mounted on said base, an angularly adjustable plate member on said carriage adapted to be adjusted about an axis extending transversely of the base, a pivotally mounted bracket or frame on said plate member, means to oscillate said frame on said carriage, a cutter head on said frame having a rotatable cutter spindle therein, means to oscillate said head relative to said frame, and means to rotate the cutter spindle.

24. In a milling lathe, in combination, a base, a cutter carriage adapted to be slidably mounted on said base, an angularly adjustable plate member on said carriage adapted to be adjusted about an axis extending transversely of the base, a pivotally mounted bracket or frame on said plate member, a cutter head on said frame having a rotatable cutter spindle therein, means to oscillate said frame and head about an axis parallel with said base, and means to rotate the cutter spindle.

In testimony whereof, I hereto affix my signature.

JOHN A. DOANE.